(12) United States Patent
Lalo

(10) Patent No.: US 12,162,615 B2
(45) Date of Patent: Dec. 10, 2024

(54) AIRCRAFT EQUIPPED WITH AT LEAST ONE PRESSURE-RELIEF DEVICE INCLUDING A MOBILE WALL RETAINED IN A CLOSED POSITION

(71) Applicant: Airbus Operations SAS, Toulouse (FR)

(72) Inventor: Olivier Lalo, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 6 days.

(21) Appl. No.: 18/333,824

(22) Filed: Jun. 13, 2023

(65) Prior Publication Data

US 2023/0406522 A1 Dec. 21, 2023

(30) Foreign Application Priority Data

Jun. 16, 2022 (FR) ........................................ 2205852

(51) Int. Cl.
*B64D 29/00* (2006.01)
*B64C 1/14* (2006.01)
*B64C 7/02* (2006.01)
*B64D 29/08* (2006.01)
*B64C 1/00* (2006.01)
(Continued)

(52) U.S. Cl.
CPC ................ *B64D 29/00* (2013.01); *B64C 1/14* (2013.01); *B64C 7/02* (2013.01); *B64D 29/08* (2013.01); *B64C 2001/009* (2013.01); *B64D 13/04* (2013.01); *B64D 29/06* (2013.01); *F01D 25/24* (2013.01); *F05D 2240/14* (2013.01)

(58) Field of Classification Search
CPC ........ B64D 29/00; B64D 29/08; B64D 13/04; B64D 29/06; B64C 1/14; B64C 7/02; B64C 2001/009; F01D 25/24; F05D 2240/14
See application file for complete search history.

(56) References Cited

U.S. PATENT DOCUMENTS 3,571,977 A * 3/1971 Abeel ................... B64C 1/1446
292/99
4,899,960 A * 2/1990 Hararat-Tehrani ........ B64C 1/18
292/259 R
(Continued)

FOREIGN PATENT DOCUMENTS

CN 110566924 A 12/2019
WO 2010066958 A1 6/2010

OTHER PUBLICATIONS

French Search Report for corresponding French Patent Application No. 2205852 dated Jan. 20, 2023; priority document.

*Primary Examiner* — Todd E Manahan
*Assistant Examiner* — Rene D Ford
(74) *Attorney, Agent, or Firm* — Greer, Burns & Crain, Ltd.

(57) ABSTRACT

An aircraft including at least one pressure-relief device having: at least one fixed part, at least one deformable mobile wall configured to occupy a closed position in which it blocks an opening, at least one retaining system configured to retain the mobile wall in the closed position as long as the wall is not in a given deformed state, the retaining system including: at least one first slot through the mobile wall opening at the level of one of its edges, for each slot, a first retaining element fastened to the fixed part and configured to cooperate with the slot as long as the mobile part is not in the given deformed state.

8 Claims, 3 Drawing Sheets

(51) Int. Cl.
*B64D 13/04* (2006.01)
*B64D 29/06* (2006.01)
*F01D 25/24* (2006.01)

(56) References Cited

U.S. PATENT DOCUMENTS

| | | | | |
|---|---|---|---|---|
| 5,085,017 A | * | 2/1992 | Hararat-Tehrani | B64C 1/18 49/141 |
| 2011/0240137 A1 | | 10/2011 | Vauchel | |
| 2020/0190876 A1 | * | 6/2020 | Lipson | E05C 3/008 |
| 2023/0192307 A1 | * | 6/2023 | Almaraz | B64D 29/06 244/129.4 |

* cited by examiner

AIRCRAFT EQUIPPED WITH AT LEAST ONE PRESSURE-RELIEF DEVICE INCLUDING A MOBILE WALL RETAINED IN A CLOSED POSITION

CROSS-REFERENCES TO RELATED APPLICATIONS

This application claims the benefit of French Patent Application No. 2 205 852 filed on Jun. 16, 2022, the entire disclosure of which is incorporated herein by way of reference.

FIELD OF THE INVENTION

The present invention concerns an aircraft equipped with at least one pressure-relief device comprising a mobile wall retained in a closed position as long as its deformation does not exceed a given deformed state.

BACKGROUND OF THE INVENTION

In one embodiment that can be seen in FIG. 1 an aircraft comprises a plurality of aircraft pylons 10 each connecting a propulsion assembly 12 and a wing 14.

Each pylon 10 comprises a primary structure assuring the transmission of forces between the propulsion assembly 12 and the wing 14 that it connects as well as a secondary structure 16 that envelopes the primary structure and forms an aerodynamic surface. This secondary structure 16 comprises a hot air exhaust 18 provided with a static grille and a pressure-relief device 20.

If the pressure in an interior zone situated below the secondary structure 16 is below a given value the pressure-relief device 20 is in a closed position. As soon as the pressure in the interior zone accidentally exceeds this given value the pressure-relief device 20 is opened and occupies an open position.

In an embodiment that can be seen in FIGS. 2 to 4 the pressure-relief device 20 comprises a door 22 that has front and rear edges 22.1, 22.2 substantially perpendicular to a vertical median plane PMV as well as lateral edges 22.3, 22.4 that are substantially symmetrical with respect to the vertical median plane PMV. By "substantially" it is meant there is no more than 10% deviation, or 5% deviation, or 1% deviation.

The pressure-relief device 20 comprises an articulation 24 for connecting the door 22 to the secondary structure 16, including swan necks for example, positioned at the level of the front edge 22.1 and enabling the door 22 to pivot between closed and open positions.

To maintain the door 22 in the closed position the pressure-relief device 20 comprises two locking systems 26 situated at the level of the rear edge 22.2 and positioned symmetrically with respect to the vertical median plane PMV. Each locking system 26 comprises a latch mobile between a locked state in which it retains the door 22 in the closed position and an unlocked state in which it allows the door 22 to pivot into the open position, as well as a spring enabling the latch to be maintained in the locked state against forces, in particular forces generated by the pressure in the interior zone, as well as those generated by the exterior pressure because of the aerodynamic pressure-reduction.

Each locking system 26 includes an adjustment system enabling adjustment of the pressure from which the latch pivots from the locked state to the unlocked state and allows the door 22 to pivot into the open position.

In practice it is very rare for the door 22 to pivot into the open position.

This embodiment is not fully satisfactory because the articulation 24 and the locking systems 26 are relatively bulky, costly and heavy, given the frequency with which the door 22 pivots into the open position.

SUMMARY OF THE INVENTION

The present invention aims to remedy some or all of the disadvantages of the prior art.

To this end, the invention has for an object providing an aircraft including at least one pressure-relief device including at least one fixed part as well as at least one mobile wall configured to occupy a closed position in which the mobile wall blocks an opening and isolates interior and exterior zones on respective opposite sides of the mobile wall as well as an open position in which the mobile wall at least partly frees the opening, the mobile wall having an interior face oriented toward the interior zone and an exterior face oriented toward the exterior zone, the pressure-relief device including at least one articulation connecting the mobile wall and the fixed part as well at least one retaining system configured to retain the mobile wall in the closed position as long as a pressure in the interior zone is lower than a given pressure value, the mobile wall having at least one edge.

According to the invention the mobile wall is configured to be deformed so that the mobile wall occupies a given deformed state if the pressure in the interior zone is at the given pressure value. Additionally, the retaining system includes at least one first slot through the mobile wall opening at the level of the edge of the mobile wall as well as, for each slot, a first retaining element fastened to the fixed part, the first retaining element and the first slot being configured so that:

the first retaining element is accommodated in the first slot and retains the mobile wall in the closed position as long as the mobile wall is not in the given deformed state, the first retaining element is no longer accommodated in the first slot and no longer retains the mobile wall in the closed position as soon as the mobile wall is in the given deformed state.

Additionally, each retaining element takes the form of a screw that comprises a body screwed into the fixed part as well as a milled head, and in that each slot has an edge surface that is flared from the interior face to the exterior face of the mobile wall, the head having a section greater than the smallest section of the slot in which the retaining element is accommodated.

A retaining system of this kind has an overall size, cost, and weight lower than those of the prior art locking systems.

In accordance with another feature the mobile wall has first and second transverse edges as well as first and second lateral edges, the articulation being positioned at the level of the first transverse edge. Additionally, the mobile wall is configured to be deformed in a deformation direction substantially perpendicular to the first and second transverse edges so that the first and second transverse edges are moved closer together when the mobile wall is deformed, the retaining system including at least one slot opening onto one of the first and second lateral edges.

In accordance with another feature the retaining system includes first and second slots opening onto each of the first and second lateral edges.

In accordance with another feature the mobile wall is substantially symmetrical with respect to a vertical median plane substantially perpendicular to the first and second transverse edges. Additionally, the first and second slots are substantially symmetrical with respect to the vertical median plane.

In accordance with another feature the mobile wall has a length corresponding to a distance separating the first and second transverse edges. Additionally, the first and second slots are separated from the second transverse edge by a distance less than ⅓ the length of the mobile wall.

In accordance with another feature each of the first and second slots extends between a first end opening at the level of the first or second lateral edge as well as a second end opposite the first end and has a median axis connecting the first and second ends at an angle less than or equal to 20° to a vertical plane perpendicular to the vertical median plane.

In accordance with another feature the articulation includes at least two deformable connecting lugs including a first part fastened to the mobile wall, a second part fastened to the fixed part as well as an omega-shape intermediate part connecting the first and second parts.

In accordance with another feature each connecting lug is made of a material that is deformed plastically when the mobile wall moves from the closed position to the open position.

BRIEF DESCRIPTION OF THE DRAWINGS

Other features and advantages of the invention will emerge from the following description given by way of example only with reference to the appended drawings, in which.

DETAILED DESCRIPTION OF THE PREFERRED EMBODIMENTS

Figure 1:
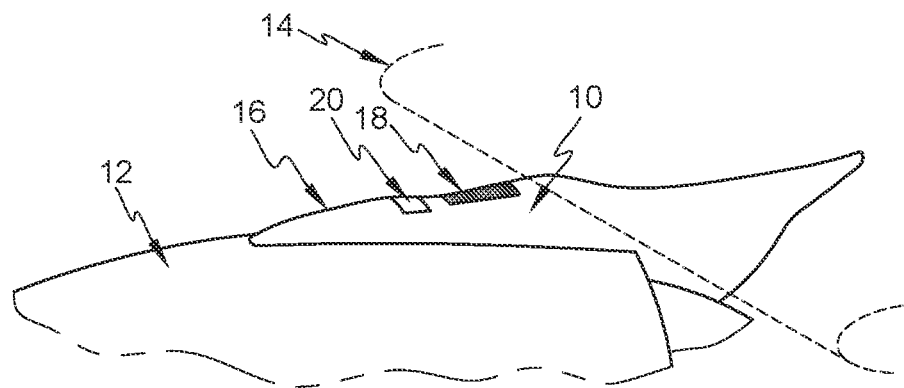
FIG. 1 is a perspective view of a secondary structure of an aircraft pylon depicting one embodiment.
Figure 2:
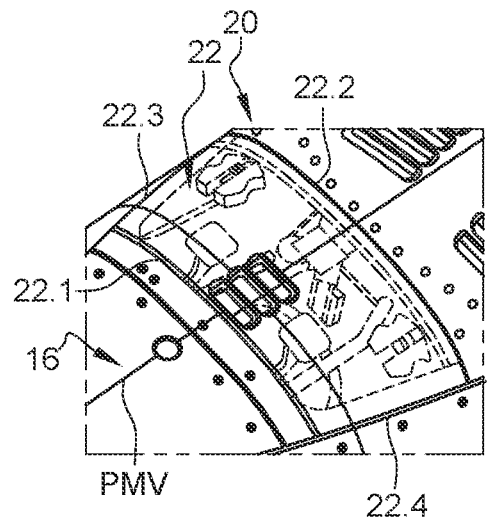
FIG. 2 is a perspective view of a pressure-relief door in a closed position depicting a prior art embodiment.
Figure 3:
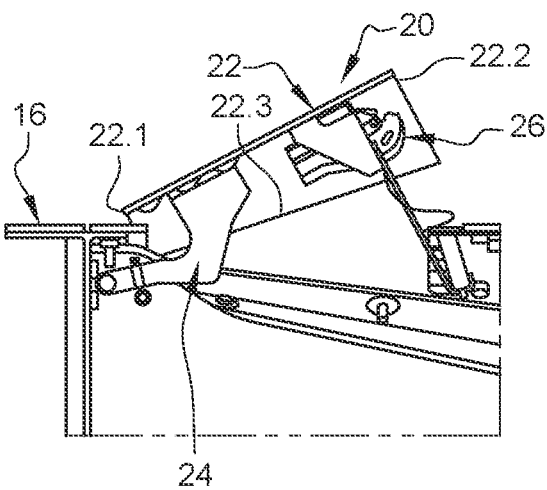
FIG. 3 is a longitudinal section of the pressure-relief door seen in FIG. 2 in an open position.
Figure 4:
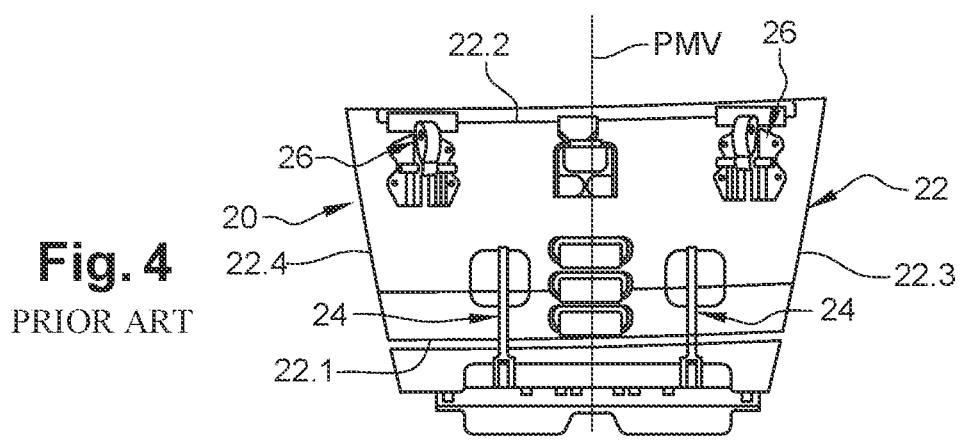
FIG. 4 is a longitudinal section of the pressure-relief door seen in FIG. 3 in a closed position.

In an embodiment seen in FIGS. 5 to 8 a fairing 30 separates an interior zone ZI below the fairing 30 and an exterior zone ZE above the fairing 30. In one application the fairing 30 corresponds to a secondary structure of an aircraft pylon.

The fairing 30 comprises an opening 32 enabling the interior and exterior zones ZI and ZE to communicate as well as a pressure-relief device 34 including at least one mobile wall 36 configured to occupy a closed position in which the mobile wall 36 blocks the opening 32 and isolates the interior and exterior zones ZI, ZE as well as an open position in which the mobile wall 36 at least partly frees the opening 32, the interior and exterior zones ZI, ZE communicating with one another. Around the opening 32 the fairing 30 comprises an exterior face F30 in contact with an airflow. The mobile wall 36 has an interior face F36 oriented toward the interior zone ZI and an exterior face F36' oriented toward the exterior zone ZE and flush with the exterior face F30 of the fairing 30.

In one embodiment the mobile wall 36 is symmetrical with respect to a vertical median plane PMV. It has a first transverse edge 36.1 positioned in a first plane substantially perpendicular to the vertical median plane PMV, a second transverse edge 36.2 positioned in a second plane substantially parallel to the first plane and perpendicular to the vertical median plane PMV as well as first and second lateral edges 36.3, 36.4 connecting the first and second transverse edges 36.1, 36.2 that are symmetrical with respect to the vertical median plane PMV.

In this embodiment the opening 32 has first and second transverse sides 32.1, 32.2 positioned in planes substantially perpendicular to the vertical median plane PMV as well as first and second lateral sides 32.3, 32.4 connecting the first and second transverse sides 32.1, 32.2.

The mobile wall 36 and the opening 32 are configured so that in the absence of deformation of the mobile wall 36 there remains a zero or small clearance between, respectively, the first and second transfer edges 36.1, 36.2 of the mobile wall 36 and the first and second transverse edges 32.1, 32.2 of the opening 32 as well as between, respectively, the first and second lateral edges 36.3, 36.4 of the mobile wall 36 and the first and second lateral sides 32.3, 32.4 of the opening 32.

By small clearance is meant that each edge 36.1 to 36.4 of the mobile wall 36 is separated from the corresponding side 32.1, 32.4 of the opening 32 by a distance less than or equal to 5 mm.

In one application the pressure-relief device 34 is positioned at the level of the secondary structure of an aircraft pylon so that the vertical median plane PMV of the mobile wall 36 coincides with the vertical median plane PMV of the aircraft pylon. The first transverse edge 36.1 is oriented toward the front of the aircraft and the second transverse edge 36.2 is oriented toward the rear of the aircraft. Of course, the invention is not limited to this application. Accordingly, an aircraft may comprise one or more pressure-relief devices.

Figure 7:
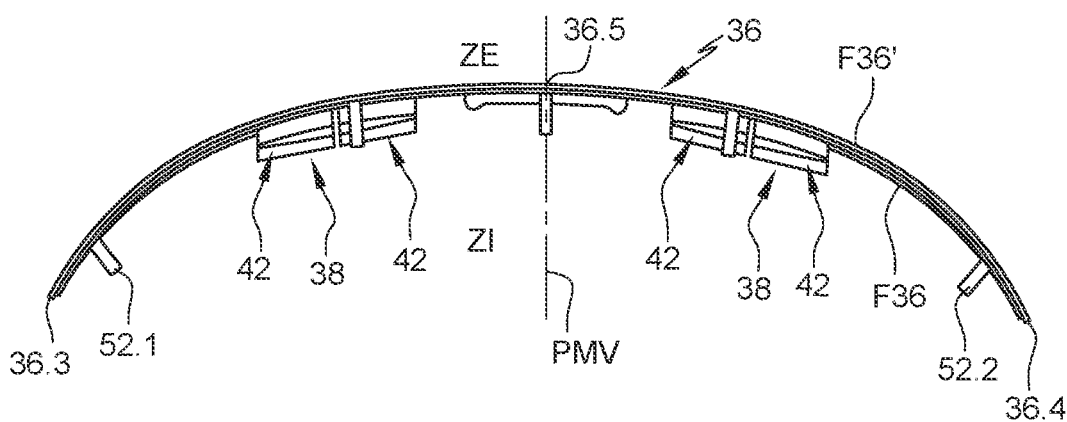
FIG. 7 is a cross section of a pressure-relief device depicting an embodiment of the invention.

In one embodiment depicted in FIG. 7 the mobile wall 36 has a radius of curvature in a transverse plane which is vertical and perpendicular to the vertical median plane PMV. In this embodiment the mobile wall 36 has at the level of the vertical median plane PMV an upper generatrix 36.5 connecting the first and second transverse edges 36.1, 36.2 offset upward relative to the first and second lateral edges 36.3, 36.4.

In one configuration the mobile wall 36 has an approximately cylindrical shape.

The mobile wall 36 is configured so that it can deformed, in particular if the pressure in the interior zone ZI increases, so that the first and second lateral edges 36.3, 36.4 are moved closer together.

The pressure-relief device 34 includes a fixed part 40 and at least one articulation 38 connecting the mobile wall 36 and the fixed part 40. In one configuration the fixed part 40 includes at the level of the first side 32.1 of the opening 32 a wall that includes an interior face F40 oriented toward the interior zone ZI and an exterior face F40' oriented toward the exterior zone ZE. In one arrangement, in the case of a pressure-relief device 34 positioned on the secondary structure of an aircraft pylon, the fixed part 40 is a wall positioned in front of the mobile wall 36, the articulation 38 connecting the first transverse edge 36.1 of the mobile wall 36 and the fixed wall 40.

In an embodiment that is not represented the articulation 38 includes swan necks.

Figure 8:
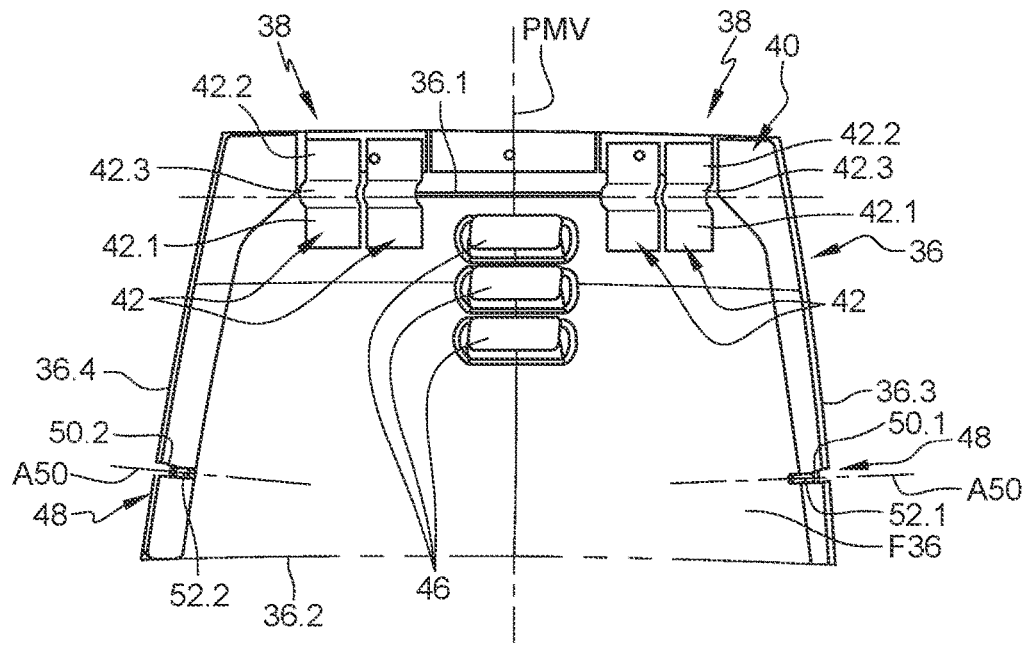
FIG. 8 is a view from below of a pressure-relief device depicting an embodiment of the invention.
Figure 9:
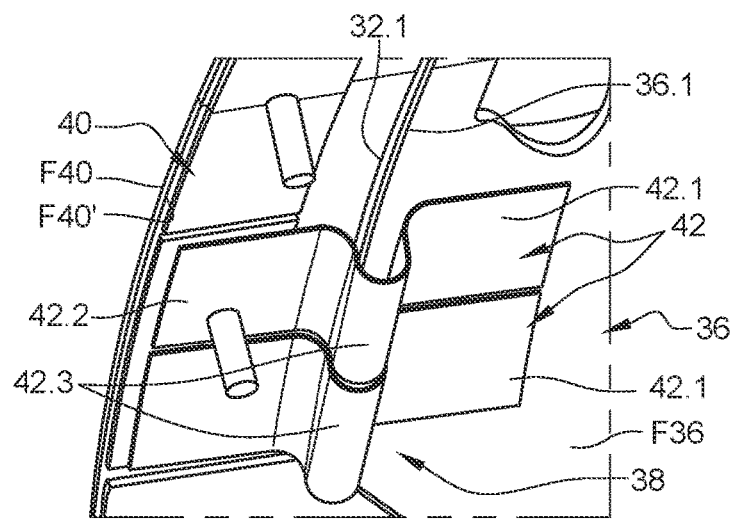
FIG. 9 is a perspective view of a part of an articulation of a pressure-relief device depicting an embodiment of the invention.

In another embodiment seen in particular in FIGS. 8 and 9 the articulation 38 includes at least two deformable connecting lugs 42 positioned on respective opposite sides of the vertical median plane PMV and each connecting lug 42 comprises a first part 42.1 fastened to the mobile wall 36, a second part 42.2 fastened to the fixed part 40 as well as an omega-shape intermediate part 42.3 connecting the first and second parts 42.1, 42.2.

The first part 42.1 is pressed against the interior face F36 of the mobile wall 36 and glued or welded to the latter or connected to the latter by means of fixing elements passing through it such as rivets or bolts for example.

The second part 42.2 is pressed against the interior face F40 of the fixed wall 40 and glued or welded to the latter or connected to the latter by means of fixing elements passing through it such as rivets or bolts for example.

At least one zone of the intermediate part 42.3 is situated away from the mobile and fixed walls 36, 40 and offset toward the interior zone ZI relative thereto.

Each connecting lug 42 takes the form of a thin strip of material such as sheet metal for example.

In one embodiment each connecting lug 42 is made of a material that is deformed plastically if the mobile wall 36 goes from the closed position to the open position. In one configuration each connecting lug 42 is made of Z6 grade stainless steel for example. Thanks to the capacity of the connecting lugs 42 to be deformed plastically and not elastically, the mobile wall 36 tends to remain in the open position and not to be closed again because of any elastic properties that the connecting lugs 42 might have.

In an arrangement seen in FIG. 8 the articulation 38 comprises four connecting lugs 42 disposed symmetrically with respect to the vertical median plane PMV. Providing connecting lugs 42 instead of swan necks enables the overall size, cost and weight of the articulation 38 to be reduced.

Figure 6:
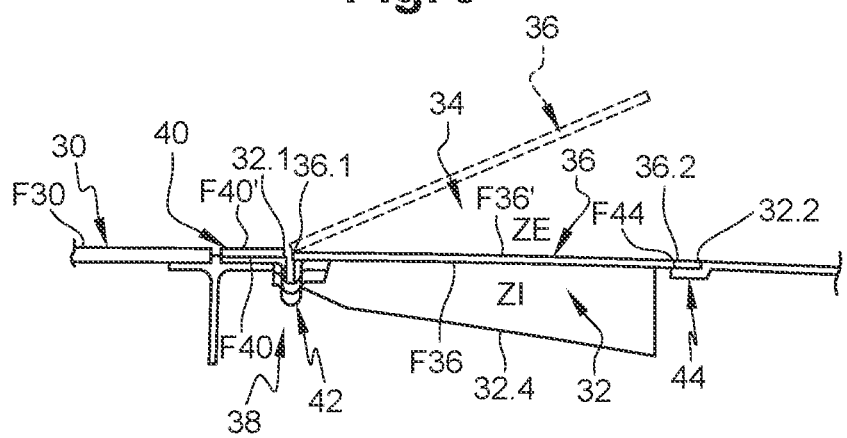
FIG. 6 is a longitudinal section of a pressure-relief device depicting an embodiment of the invention.

In a configuration seen in FIG. 6 the fixed part 40 includes a transverse rim 44 positioned opposite the articulation 38 at the level of the second transverse edge 36.2 of the mobile wall 36 and having a contact face F44 against which the mobile wall 36 is in contact when it is in the closed position. The contact face F44 is offset toward the interior zone ZI relative to the exterior face F30 of the fairing 30 so that the exterior face F36' of the mobile wall 36 and the exterior face F30 of the fairing are flush when the mobile wall 36 is in the closed position.

In one embodiment the pressure-relief device 34 includes at least one connection for maintaining the mobile wall 36 ajar, positioned at the level of the second edge 36.2 opposite the articulation 38 and connecting the mobile wall 36 and the fairing 30. In one configuration the mobile wall 36 includes at least one orifice 46 passing through it. In one configuration the mobile wall 36 includes a plurality of oblong orifices 46, each of which is symmetrical with respect to the vertical median plane PMV.

The pressure-relief device 34 also includes at least one retaining system 48 configured to retain the mobile wall 36 in the closed position as long as a pressure in the interior zone ZI is below a given pressure value. If the pressure in the interior zone ZI reaches the given pressure value the mobile wall occupies a given deformed state.

In one embodiment the retaining system 48 includes a first slot 50.1 passing through the mobile wall 36 and opening at the level of its first lateral edge 36.3, a second slot 50.2 passing through the mobile wall 36 and opening at the level of its second lateral edge 36.4, a first retaining element 52.1 fastened to the fixed part 40, positioned at the level of the first lateral side 32.3 of the opening 32 and configured to cooperate with the first slot 50.1 when the mobile wall 36 is in closed position and in an undeformed state, as well as a second retaining element 52.2 fastened to the fixed part 40, positioned at the level of the second lateral side 32.4 of the opening 32 and configured to cooperate with the second slot 50.2 when the mobile wall 36 is in the closed position and in an undeformed state.

In one configuration the fixed part 40 includes a first lateral rim 54 in line with the first slot 50.1 against which the interior face F36 of the mobile wall 36 bears in the closed position and in the undeformed state as well as a second lateral rim in line with the second slot 50.2 against which the interior face F36 of the mobile wall 36 bears in the closed position and in the undeformed state.

Figure 10:
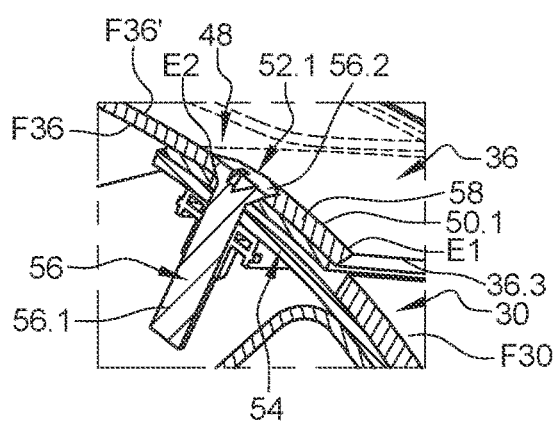
FIG. 10 is a cross section of a closed position maintaining system of a pressure-relief device depicting an embodiment of the invention.
Figure 11:
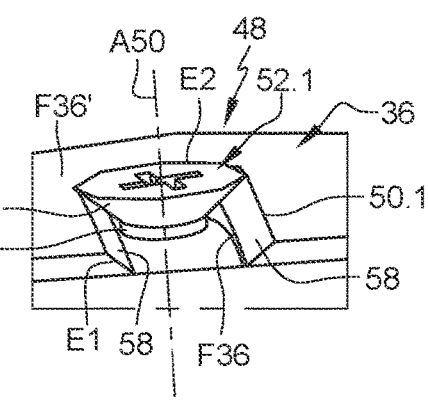
FIG. 11 is a perspective view the closed position maintaining system seen in FIG. 10.

As depicted in FIGS. 10 and 11 each of the first and second retaining elements 52.1, 52.2 takes the form of a screw 56 that includes a body 56.1 screwed into the fixed part, more particularly into the first or second lateral rim 54, as well as a head 56.2 having a section greater than the smallest section of the first or second slot 50.1, 50.2.

In one configuration the head 56.2 is a milled head. Additionally, each of the first and second slots 50.1, 50.2 has an edge surface 58 that is flared from the interior face F36 to the exterior face F36'. In one configuration the opposite portions of the edge surface 58 delimiting the first or second slot 50.1, 50.2 are at an angle substantially identical to the angle formed by the milled head. Each of the first and second slots 50.1, 50.2 therefore has a smaller section at the level of the interior face F36 of the mobile wall 36 that is larger than the section of the body 56.1 of the screw 56 and less than the largest section of the head 56.2 of the screw 56 as well a larger section at the level of the exterior face F36' of the mobile wall 36 that is substantially equal to the largest section of the head 56.2 of the screw 56.

The thickness of the mobile wall 36 and the separation between the head 56.2 of the screw 56 and the fixed part 40 (more particularly the first or second lateral rim 54) are adjusted so that in the undeformed state of the mobile wall 36 the latter is pressed against the first and second lateral rims 54 and the head 56.2 of each screw 56 is flush with the exterior face F36' of the mobile wall 36.

In accordance with one particular feature of the invention, the first and second retaining elements 52.1, 52.2 are positioned on the fixed part 40 so that they are respectively accommodated in the first and second slots 50.1, 50.2 and retain the mobile wall in the closed position as long as the pressure in the interior zone ZI is below the given pressure value and the mobile wall 36 has not reached the given deformed state and so that they are no longer accommodated in the first and second slots 50.1, 50.2 and no longer retain the mobile wall 36 in the closed position as soon as the pressure in the interior zone ZI is greater than or equal to the given pressure value and the mobile wall 36 has reached the given deformed state.

In one arrangement each of the first and second slots 50.1, 50.2 extends between a first edge E1 opening at the level of the first or second lateral edge 36.3, 36.4 as well as a second edge E2 opposite the first edge E1 and has a length (i.e. the distance between the first and second edges E1, E2) such that each of the first and second retaining elements 52.1, 52.2 is positioned at the level of the second edge E2 of the first or second slot 50.1, 50.2 in which it is accommodated when the mobile wall 36 is in the undeformed state.

In one configuration each of the first and second slots 50.1, 50.2 has a median axis A50 connecting the first and second edges E1, E2 at an angle less than or equal to 20° relative to a vertical plane perpendicular to the vertical median plane PMV. In one arrangement the first and second slots 50.1, 50.2 are symmetrical with respect to the vertical median plane PMV. The first and second slots 50.1, 50.2 are separated from the second transverse edge 36.2 by a distance less than ⅓ the length of the mobile wall 36 that corresponds to the distance separating the first and second transverse edges 36.1, 36.2.

Of course, the invention is not limited to this embodiment. Regardless of the embodiment, the mobile wall 36 is configured to be deformed in at least one deformation direction, in particular in the event of excess pressure in the interior zone ZI, so that opposite first and second edges intersecting the deformation direction are moved closer together, the fixed part 40 to which the mobile wall 36 is connected being substantially undeformable. Additionally, the retaining system 48 includes at least one first slot 50.1 through the mobile wall 36 opening at the level of one of the opposite first and second edges of the mobile wall 36 as well as, for each slot 50.1, a first retaining element 52.1 fastened to the fixed part 40, positioned at the level of one of the sides of the opening 32 and configured to cooperate with the first slot 50.1 when the mobile wall 36 is in the closed position and in a non-deformable state. The first retaining element 52.1 and the first slot 50.1 are configured so that the first retaining element 52.1 is accommodated in the first slot 50.1 and retains the mobile wall 36 in the closed position as long as the pressure in the interior zone ZI is lower than the given pressure value and the mobile wall 36 has not reached the given deformed state and so that the first retaining element 52.1 is no longer accommodated in the first slot 50.1 and no longer retains the mobile wall 36 in the closed position as soon as the pressure in the interior zone ZI is greater than or equal to the given pressure value and the mobile wall 36 has reached the given deformed state.

Figure 5:
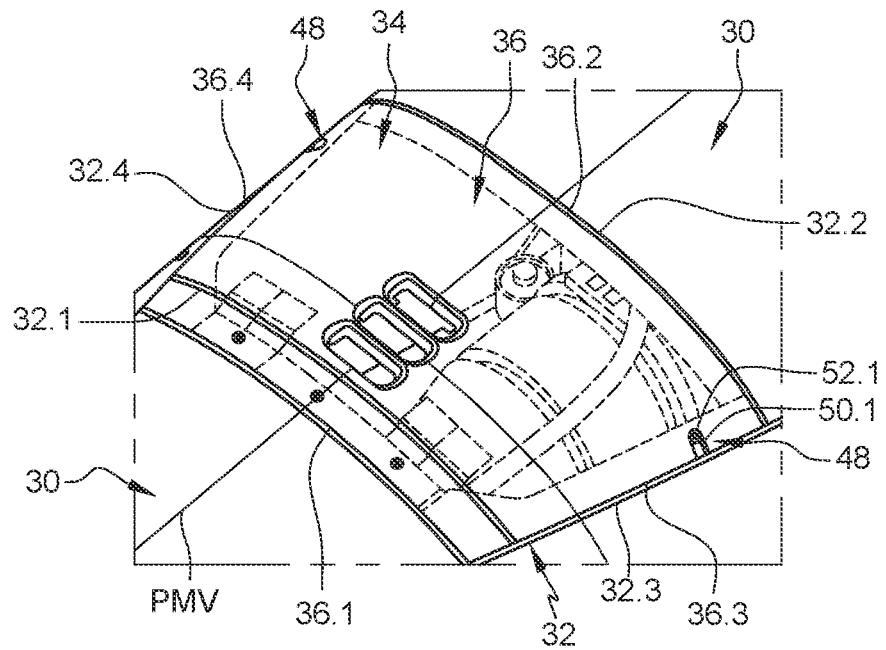
FIG. 5 is a perspective view from an exterior zone of a secondary structure of an aircraft pylon of a pressure-relief device in a closed position depicting an embodiment of the invention.

In one configuration the deformation direction is substantially perpendicular to the first and second lateral edges 36.3, 36.4. Additionally, the retaining system 48 includes at least one slot opening onto one of the first and second lateral edges 36.3, 36.4. In one arrangement the retaining system 48 includes first and second slots 50.1, 50.2 opening onto each of the first and second lateral edges 36.3, 36.4, as depicted in FIGS. 5, 7 and 8.

In another configuration the deformation direction is substantially perpendicular to the first and second transverse edges 36.1, 36.2, the articulation 38 that connects the mobile wall 36 and the fixed wall being positioned at the level of the first transverse edge 36.1. Additionally, the retaining system 48 includes a slot opening onto the second transverse edge 36.2 opposite that where the articulation 38 is positioned.

Regardless of the embodiment each retaining system according to the invention has an overall size, cost and weight less than those of prior art locking systems.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. An aircraft comprising:
at least one pressure-relief device including at least one fixed part and at least one mobile wall configured to occupy a closed position in which the at least one mobile wall blocks an opening and isolates interior and exterior zones on respective opposite sides of the mobile wall as well as an open position in which the at least one mobile wall at least partly frees the opening, the at least one mobile wall having an interior face oriented toward the interior zone and an exterior face oriented toward the exterior zone, the at least one pressure-relief device including at least one articulation connecting the mobile wall and the fixed part as well at least one retaining system configured to retain the mobile wall in the closed position as long as a pressure in the interior zone is lower than a given pressure value, the at least one mobile wall having at least one edge,
wherein the at least one mobile wall is configured to be deformed so that the at least one mobile wall occupies a given deformed state when the pressure in the interior zone is at the given pressure value, and
wherein the retaining system includes at least one slot through the at least one mobile wall opening at a level of the at least one edge of the at least one mobile wall, and, for each slot, a first retaining element fastened to the fixed part, the first retaining element and the first slot being configured so that:
the first retaining element is accommodated in the at least one slot and retains the at least one mobile wall in the closed position as long as the at least one mobile wall is not in the given deformed state,
the first retaining element is no longer accommodated the at least one slot and no longer retains the at least one mobile wall in the closed position as soon as the at least one mobile wall is in the given deformed state,
wherein each retaining element comprises a screw that includes a body screwed into the fixed part and a milled head, and
wherein each slot has an edge surface that is flared from an interior face to the exterior face of the mobile wall, the head having a section greater than a smallest section of said slot in which the retaining element is accommodated.
2. The aircraft as claimed in claim 1, wherein the at least one edge includes first and second transverse edges and first and second lateral edges, the articulation being positioned at a level of the first transverse edge,
> wherein the at least one mobile wall is configured to be deformed in a deformation direction substantially perpendicular to the first and second transverse edges so that the first and second transverse edges are moved closer together when the mobile wall is deformed, and
> wherein the retaining system includes the at least one slot opening onto one of the first and second lateral edges.

3. The aircraft as claimed in claim 2, wherein the at least one slot includes first and second slots opening onto each of the first and second lateral edges.

4. The aircraft as claimed in claim 3, wherein the at least one mobile wall is substantially symmetrical with respect to a vertical median plane substantially perpendicular to the first and second transverse edges, and
> wherein the first and second slots are substantially symmetrical with respect to the vertical median plane.

5. The aircraft as claimed in claim 4, wherein the at least one mobile wall has a length corresponding to a distance separating the first and second transverse edges, and
> wherein the first and second slots are separated from the second transverse edge by a distance less than ⅓ the length of the mobile wall.

6. The aircraft as claimed in claim 4, wherein each of the first and second slots extends between a first end opening at the level of the first or second lateral edge and a second end opposite the first end and has a median axis connecting the first and second ends at an angle less than or equal to 20° to a vertical plane and perpendicular to the vertical median plane.

7. The aircraft as claimed in claim 1, wherein the articulation includes at least two deformable connecting lugs including a first part fastened to the at least one mobile wall, a second part fastened to the fixed part, and an omega-shape intermediate part connecting the first and second parts.

8. The aircraft as claimed in claim 7, wherein each connecting lug is made of a material that is deformed plastically when the at least one mobile wall moves from the closed position to the open position.

\* \* \* \* \*